US010425860B2

(12) United States Patent
Oktay et al.

(10) Patent No.: US 10,425,860 B2
(45) Date of Patent: Sep. 24, 2019

(54) SYSTEM AND METHOD FOR VALUE OPTIMIZED MOBILE NETWORKS

(71) Applicant: NETSIA, INC., Sunnyvale, CA (US)

(72) Inventors: Oguz Oktay, Istanbul (TR); Arda Akman, Istanbul (TR); Ali Ozer Ercan, San Jose, CA (US); Seyhan Civanlar, Istanbul (TR)

(73) Assignee: NETSIA, INC., Sunnyvale, CA (US)

(*) Notice: Subject to any disclaimer, the term of this patent is extended or adjusted under 35 U.S.C. 154(b) by 0 days.

(21) Appl. No.: 15/803,437

(22) Filed: Nov. 3, 2017

(65) Prior Publication Data

US 2019/0141580 A1    May 9, 2019

(51) Int. Cl.
| *H04W 72/00* | (2009.01) |
| *H04W 28/24* | (2009.01) |
| *H04W 24/08* | (2009.01) |
| *H04W 72/08* | (2009.01) |
| *H04W 8/18*  | (2009.01) |
| *H04W 72/04* | (2009.01) |
| *H04W 16/04* | (2009.01) |

(52) U.S. Cl.
CPC ............ *H04W 28/24* (2013.01); *H04W 8/18* (2013.01); *H04W 24/08* (2013.01); *H04W 72/08* (2013.01); *H04W 16/04* (2013.01); *H04W 72/0473* (2013.01)

(58) Field of Classification Search
CPC ..... H04W 24/00; H04W 28/04; H04W 28/18; H04W 28/24; H04W 72/085; H04W 72/08; H04W 24/08; H04W 8/18; H04W 72/0473; H04W 16/04

USPC ........................................................ 455/452.2
See application file for complete search history.

(56) References Cited

U.S. PATENT DOCUMENTS

| 9,380,170    | B1 * | 6/2016  | Kateley .................. H04M 15/58 |
| 9,912,433    | B2 * | 3/2018  | Abdelmonem ......... H04L 5/006 |
| 2002/0072343 | A1 * | 6/2002  | Miyatani .............. H04B 7/0848 455/272 |
| 2013/0109431 | A1 * | 5/2013  | Zhang .................... H04B 7/024 455/522 |
| 2016/0157252 | A1 * | 6/2016  | Lu .......................... H04W 8/24 370/329 |
| 2016/0212633 | A1 * | 7/2016  | Flanagan ............... H04W 24/02 |
| 2016/0212634 | A1 * | 7/2016  | Flanagan ............. H04W 64/003 |
| 2017/0126903 | A1 * | 5/2017  | Cohen ................... H04M 15/62 |
| 2017/0372248 | A1 * | 12/2017 | Ghosh .............. G06Q 10/06393 |
| 2018/0295632 | A1 * | 10/2018 | Goodman ............ H04B 1/1036 |

* cited by examiner

*Primary Examiner* — Khoi H Tran
*Assistant Examiner* — B M M Hannan
(74) *Attorney, Agent, or Firm* — IP Authority, LLC; Ramraj Soundararajan (57) ABSTRACT

Self-Organizing Network (SON) technology has been developed to make the planning, configuration, management, and self-healing of mobile networks easier and faster, where such planning, configuration and management of the mobile networks are targeted to optimize the value offered to a group of subscribers using criteria such as (a) subscriber type (consumer, corporate, IOT, etc.), (b) service type (mission critical, public safety, VoIP, etc.), (c) subscriber usage volume (high, medium, low), (c) subscriber's requested/subscribed QoS, and (d) subscriber's paying value (i.e., revenue). The same teachings can be extended to also optimize a single subscriber's service or a service type.

21 Claims, 5 Drawing Sheets

SYSTEM AND METHOD FOR VALUE OPTIMIZED MOBILE NETWORKS

BACKGROUND OF THE INVENTION

Field of Invention

The present invention relates to a system and method designed for dynamic reconfiguration of a wireless network's performance by tuning wireless network parameters to optimize a subscriber satisfaction related value function.

Discussion of Related Art

Any discussion of the prior art throughout the specification should in no way be considered as an admission that such prior art is widely known or forms part of common general knowledge in the field.

Planning wireless network relies on static approaches for dimensioning and adjustment of the radio resources to meet varying user traffic demands. The base stations that form the access technology for wireless devices send a radio frequency signal to the antennas, which will typically be placed on towers or buildings. Each antenna serves a group of wireless users located in its coverage area. Within a coverage area different types of services such as voice, video and data are provided. Furthermore, in each coverage area, there are different types of subscribers, some are more valued than others from the operator's perspective either because they pay more for the services they get, or their applications are more mission critical, or they are simply high volume data consumers such as corporate customers.

There are many variables that determine the coverage area provided by an antenna. For example, antenna configurations and its input power are just two simple parameters. Antenna configurations are, for example, the antenna's pointing direction and tilt (up and down), and the beamwidth. Modifying such antenna configurations will change the area the antenna is serving. Similarly, the antenna's input power affects the coverage area well as the interference that impacts the coverage areas of its neighboring antennas. For example, if an antenna's input power is increased too much, it may cause interference to the coverage area of a neighboring antenna, affecting their quality of service. When the wireless network parameters are fine-tuned carefully, higher data rates for voice and data services can be achieved improving subscriber service satisfaction.

Typically, network optimization is a process used for finding the optimal configuration of the wireless network to maximize the network's performance. This process typically starts by collecting data of the current network state using monitoring devices known as probes, and then by the analysis and calculation of appropriate network parameters to improve its performance. Once a better configuration is determined, the new configuration can be implemented in the network. However, the current methods consider only networkwide performance improvement without treating groups of subscribers any differently, meaning the cost function of optimization is a 'network related' value function. Therefore, any input from customer experience, usually captured by a Customer Experience Management (CEM), has not been a consideration in prior art for network planning and optimization. Instantaneous improvements in network conditions to increase a group of subscriber's performance are exceedingly becoming important.

Self-Organizing Networks (SON) is a growing area of interest and use in planning of wireless networks. With SON, the network is able to monitor its own performance, and can optimize network variables to provide the optimum performance in real-time. Doing so, network operators can benefit from significant improvements in terms of capital expense and operational expense. With increasing usage of data services, and more dense networks in LTE, wireless network planning and maintenance is getting much more complicated and challenging than its early days. Much of the complexity has been brought about by the introduction of 5G/LTE (Long Term Evolution) creating dense networks with a large number of micro and femto cells as well as relay nodes being relied upon to ensure that the required overall capacity can be met. The Third Generation Partnership Project, 3GPP is the organization first introduced the concept of self-organizing networks, SON and specified its standards. In addition, the Next Generation Mobile Networks, NGMN, alliance introduced the concept of SON with the aims of (a) reducing the operating cost by reducing the level of human intervention in network design and operation, (b) reducing capital expenditure by optimizing the use of available resources, and (c) protecting revenue by reducing the number of human errors. There are several key areas of SON:

Self-Configuration: The aim is for base stations to become "Plug and Play", meaning minimal manual intervention should be required in the configuration process.

Self-Optimization: Once the system has been set up, it will be necessary to optimize the operational characteristics using software tools to best meet the needs of the overall network.

Self-Healing: Failures within the network cause major impact to resources available to users. However, with SON, certain actions can mitigate the impact. For example, the boundaries of adjacent cells can be enlarged to compensate for the failed cells by increasing antenna power levels and antenna configurations, etc.

Although SON attacks all three areas outline above, thus far it does not optimize the network parameters to improve customer experience in a selective and intelligent manner.

Customer experience management (CEM) is defined most generally as the collection of processes a company uses to track, oversee and organize every interaction between a customer and the organization throughout the customer lifecycle. The goal of CEM is to optimize interactions from the customer's perspective and foster customer loyalty. Within the context of a wireless network, CEM handles the interactions between the subscribers and the Operator to improve subscriber's value from the service. Several CEM platforms exist in prior art providing analytics solutions for data analysis and correlation using data obtained from an Operator's operating and business support systems to identify and rectify certain group of problems impacting subscribers' satisfaction. However, CEM does not provide mechanisms to directly interfere the network operations in real-time to improve certain group of valued subscribers' service quality by changing network parameters. Meaning, the bridge between SON and CEM has not been established to date.

The frequencies allocated or under discussion for additional bandwidth for cellular use for LTE have so far all been below 6 GHz, mostly due to the favorable wide area coverage properties of the lower frequencies. While more spectrum below 6 GHz is needed and there are promising techniques to increase the use of already allocated frequencies, there will also be an increasing need to unlock new spectrum bands. These bands will help to meet the high capacity and data rate requirements. Bands above 6 GHz can be broadly split in two parts, centimetric wave (3-30 GHz) and millimetric wave (30-300 GHz), based on different radio propagation characteristics and the carrier bandwidth possible in the different frequency ranges.

Spectral efficiency of LTE networks is greatly improved by the massive MIMO technology to achieve high data rates. Integrating large-scale antenna arrays into the air interface design of LTE base stations in the centimetric wave or millimetric wave bands will show significant differences to the MIMO solutions currently deployed in 4G systems. As a special MIMO technique, 'beam-forming' permits targeted illumination of specific areas, making it possible to improve transmission to specific user(s) at the far reaches of cell coverage. With large-scale antenna arrays deployed at the LTE base stations, there is the potential for deploying large numbers of antennas on user equipment (UE), especially at the centimetric (6 Hz-30 Hz) and millimetric (30 Hz and up) frequency bands where the antenna sizes become rather small. The per-UE directed antenna and beam become variables that control the wireless capacity provided to each individual user. The diversity of antennas is achieved in two ways: (a) multiple transmitters to a single receiver (MISO) that can increase the strength of the signal at very low SINR; (b) single transmitter to multiple receivers (SIMO) that can be used by the UE to combine the same signal and increase the SINR. MIMO can increase the data rate and spectrum efficiency by taking the advantage of spatial multiplexing.

The advantage of beam forming that LTE provides is obvious. It has been nominated in the standards so that the beam forming can increase the SINR of a target user. The antenna array system can trace the location of the user, and supply a dynamic coverage to reduce the interference among users so that the total capacity available to a particular user(s) is increased. Massive MIMO with large number of antennas is being implemented in LTE as 3D-MIMO using both horizontally and vertically placed antennas. Use of 3D-MIMO results in 3-D beam forming using both horizontal and vertical directions allowing a very narrow beam projected towards a single user, which is more accurate than the conventional 2D beam forming that can provide the beam for a range.

Embodiments of the present invention are an improvement over prior art systems and methods.

SUMMARY OF THE INVENTION

In one embodiment, the present invention provides a method to optimize, in real-time, a plurality of access network parameters in a radio access network, wherein a plurality of subscribers of one or more services provided by the radio access network have different relative subscriber values and weights to a network operator, the method comprising the steps of: (a) receiving subscriber performance indicators and network performance data regarding a plurality of base stations forming the radio access network, wherein each of the plurality of base stations providing communications services to a group within the plurality of subscribers; (b) optimizing, in real-time, a cost function, wherein the cost function is a function of the following: (i) subscriber performance indicators received in (a), (ii) relative subscriber values, (iii) relative subscriber weights, and (iv) network performance data, the optimizing step performed to improve communications services provided to the plurality of subscribers; (c) determining a new set of access network parameters improving the service performance for the plurality of subscribers; and (d) sending instructions to systems controlling access network parameters to change access network configurations according to the new set of access network parameters.

In another embodiment, the present invention provides an article of manufacture comprising non-transitory computer storage medium storing computer readable program code which, when executed by a computer, implements a method to optimize, in real-time, a plurality of access network parameters in a radio access network, wherein a plurality of subscribers of one or more services provided by the radio access network have different relative subscriber values and weights to a network operator, the medium comprising: (a) computer readable program code receiving subscriber performance indicators and network performance data regarding a plurality of base stations forming the radio access network, wherein each of the plurality of base stations providing communications services to a group within the plurality of subscribers; (b) computer readable program code optimizing, in real-time, a cost function, wherein the cost function is a function of the following: (i) subscriber performance indicators received in (a), (ii) relative subscriber values, (iii) relative subscriber weights, and (iv) network performance data, the optimizing step performed to improve communications services provided to the plurality of subscribers; (c) computer readable program code determining a new set of access network parameters improving the service performance for the plurality of subscribers; and (d) computer readable program code sending instructions to systems controlling access network parameters to change access network configurations according to the new set of access network parameters.

In yet another embodiment, the present invention provides a system called a Value Optimization Engine (VOE), the system comprising: (a) means to receive input to define or chose from a set of existing cost functions, V, to improve subscriber performance indicators; (b) a software program to collect and correlate network performance data and subscriber performance indicators, and to determine an optimum operating point, V(opt) using (1) relative values of subscribers and (2) relative weights of subscribers; (c) self-learning AI engine that learns from said program; (d) a communication interface to communicate with wireless network's: (1) Operations Administration and Management System—OAM, or self-organizing network SON controller to apply V(opt) to the new operating point of the wireless network; (2) the Operation Support System—OSS, and Business Support System—BSS to collect rules and policies, and network performance data; and (3) the Customer Experience Management System—CEM and Billing and Revenue Management System—BRM to collect data related to subscriber value and weight.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Self-Organizing Network (SON) technology has been developed to make the planning, configuration, management and self-healing of mobile networks easier and faster. So far, the main goals of the self-organizing technologies were to optimize the network performance and minimize the network operations costs. However, with this invention, the goal of the planning, configuration and management of the mobile networks are targeted to optimize the value to a group of subscribers using criteria such as (a) subscriber type (consumer, corporate, IOT, etc.), (b) service type (mission critical, public safety, VoIP, etc.), (c) subscriber usage volume (high, medium, low), (c) subscriber's requested/subscribed QoS, and (d) subscriber's paying value (i.e., revenue). The method can be extended to optimize even a single subscriber's service or a service type.

The performance of a subscriber's service quality can be quantified using the physical layer and IP layer performance data collected directly from the subscriber's radio channel at the user equipment (UE) end or at the network end (serving base station or core network monitoring probes or routers). At the physical layer, each UE periodically feeds the signal to noise ratio (SINR) of its own channel to the serving base station. Other performance indicators are (a) the channel's data throughput, delay and packet loss all measured at the IP layer, (b) handover success rate and cell drop rate, both of which are measured at the physical layer. A combination of such indicators can be used as the subscriber performance indicator.

An embodiment of the invention is directed to a method for optimizing a plurality of cell site parameters in a radio access network. The method includes receiving both subscriber performance indicators and network performance data regarding a plurality of cell sites and plurality of subscribers, each cell site corresponding to a coverage area for providing communications in a wireless network, evaluating the subscriber performance indicators and network performance data together in real-time to determine if communications provided to a plurality of high valued subscribers have been degraded; and determining new values for a set of wireless access network parameters (e.g., serving base station's MIMO antenna downtilt angle, number of transmit antenna's serving the user, the 3D or 2D beam vector parameters and power etc.) directly controlling the subscriber's service quality.

An embodiment of this invention further includes a method for determining best neighbor cell sites among the neighbor cell sites to serve a group of subscribers; determining if the serving base stations have available resources for achieving a desired improvement in select subscribers' service; determining if the serving base station has available resources for achieving the desired improvement in communications. When it is determined that the serving base stations do not have adequate available resources for achieving the desired improvements in communications, altering wireless network parameters or the serving cells sites for achieving the desired improvement in communications. Altering of wireless network parameters have been performed in real-time using a special learning algorithm wherein the cost function is a value derived from subscriber satisfaction index.

Another embodiment of this invention includes a method for changes in the wireless network's core network parameters to improve the available capacity to a group of subscribers.

An embodiment of the invention is also directed to a program/software recorded on a computer-readable storage medium for collecting subscriber performance indicators and network performance data and optimizing the wireless network parameters to maximize a value defined from subscriber satisfaction. The program causes a computer to execute optimizing steps comprising continuously receiving network data from a plurality of base stations; evaluating the data to determine if the value defined as the satisfaction from subscriber services provided by the plurality of base stations has been degraded and determining how to improve it, and applying alteration to network parameters accordingly.

In one embodiment, the present invention provides a special Value Optimization Engine (VOE): (a) an interface that receives input (manual or electronic) to define or choose from a set of existing subscriber satisfaction oriented value functions, V, to improve network performance; (b) a software program to collect and correlate network data and subscriber performance indicators, and to determine an optimum operating point, V(opt), (b) a communication interface to communicate with wireless network's Operations Administration and Management System—OAM, or self-organizing network SON platform to apply the optimization results of V(opt) to the new operating point of the wireless network (such as changing number of serving antennas, the down-tilt angle of an antenna or redirecting a beam); (c) a communication interface to communicate with Operation Support System—OSS, Business Support System—BSS, Customer Experience Management System—CEM and a Billing and Revenue Management System (BRM). The BRM may be a Customer Relationship Management (CRM) system or separate revenue or billing system in which the revenue collected from each subscriber is computed and stored.

In this embodiment, let's say an exemplary value function, V, is defined as the sum of multiplication of each subscriber's normalized subscriber performance indicator (say a number between 0 and 1, 0 being the worst performance and 1 being the best performance received by the subscriber) multiplied with the relative value of each subscriber (a number between 0 and 1, 1 being the most valued subscriber and 0 being the least values subscriber) and a weight associated with each subscriber.

$$V = \sum_i w_i \cdot c_i \cdot r_i \quad (1)$$

In one embodiment, V is a linear function wherein $c_i$ can be derived from the 'subscriber experience rating' obtained from the CEM system (or a similar system) for subscriber i (higher value being more satisfied), $r_i$ can be derived from the revenue reported by the BRM system for customer i, and $w_i$ can be a policy-based weight associated with a subscriber type (e.g., $w_i$=0 for Internet of Things (TOT) users to eliminate them from the pool of subscribers, and $w_i$=1 all non-IOT users). To keep it simple $w_i$ can be binary, i.e., 0 or 1. Alternatively, it can be a weight in the range of [0-1] to give less importance to a specific group of users—such as those located at the edges of a cell so as not to waste precious resources to optimize subscribers in highly difficult locations. Although V is not shown as time-varying in Eq. (1) for simplicity, it is indeed time-varying. In this equation both $c_i$ and $r_i$ are time-varying variables, but only $c_i$ can be directly affected by the dynamic configuration changes in the network. When a network configuration change has been implemented to improve performance, an estimate of $c_i$ can be made and the corresponding V can be recalculated. There are several stochastic radio channel models in prior art that can estimate the change in a mobile terminal's uplink and downlink performances for a given a set of radio parameters listed above. The above equation can be further generalized as $$V = \sum_i f(w_i \cdot c_i \cdot r_i) \quad (2)$$

wherein $f(\cdot)$ denotes a more general function as opposed to a linear function shown in Eq. (1) to account for other possible value models such as a utility-proportional fairness function well-known in prior art.

The goal of the Value Optimization Engine (VOE), the system of invention, will be to maximize the value of the V by making dynamic changes to network configuration. These changes will be performed via OAM and/or SON interfaces. The configuration changes decided by the VOE do not necessarily improve the CEM rating for every subscriber—it may actually deteriorate some customers' rating, but it targets to optimize the total value of function V. Although the focus of this invention has been the optimization of radio access network, it is obvious to one skilled in art to extend the concepts to factor in the optimization of the core network.

VOE can decide on dedicating one radio access beam to a priority customer if the total value calculated by this decision does increase the present total value of the V. However, VOE may not decide to direct a beam to the same customer if the value calculated on this customer is offset by the value reduction on other customers affected by that decision.

Figure 1:
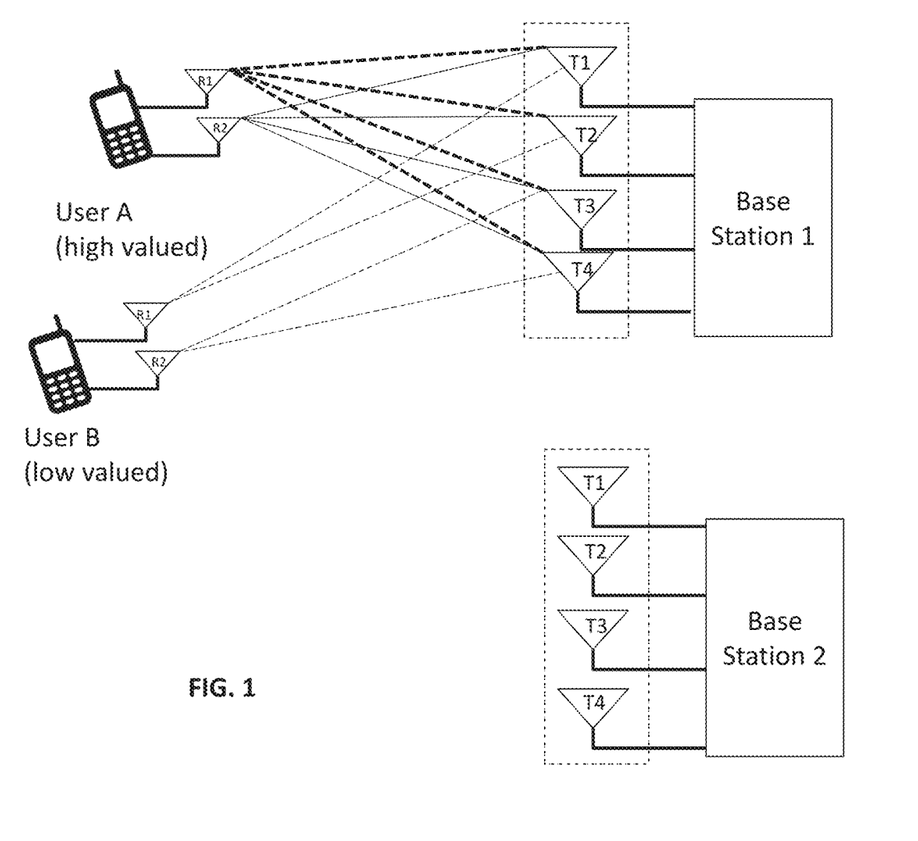
FIG. 1 illustrates a simple access network before a VOE reconfiguration.

A simple access networking scenario with two users, a highly valued user A and a regular user (low valued) B is illustrated in FIG. 1. Each user's equipment is furnished with two receive antennas. Two base stations are illustrated in the users' neighborhood. Both MIMO base stations have four transmit antennas, T1, T2, T3 and T4, and two 3D beams directable towards receive antennas R1 and R2 of the user's equipment for exemplary purposes. In the first network configuration (NC1) shown in FIG. 1, Base Station 1 is serving both users A and B, and Base Station 2 is not serving any of these users. In the alternate network configuration (NC2) shown in FIG. 2, user B is forced to be served by Base Station 2, while Base Station 1 only serves user A, resulting in higher access network performance.

Figure 2:
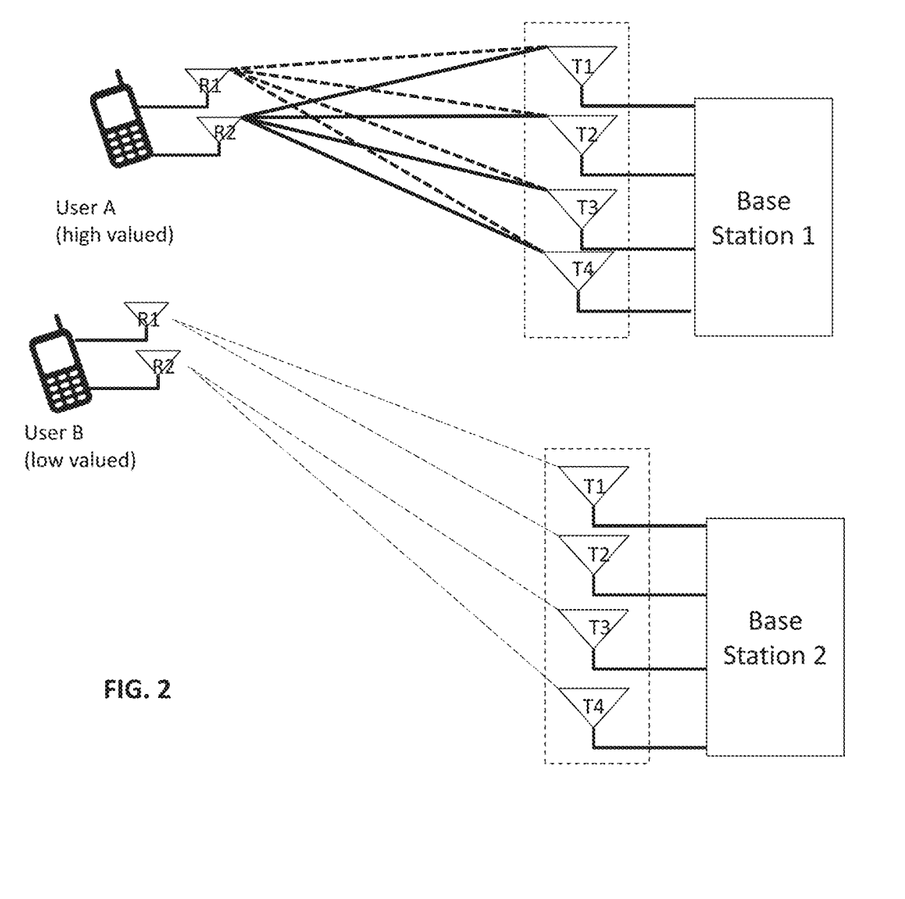
FIG. 2 illustrates a simple access network after the optimization of VOE.

The value function corresponding to NC1 and NC2 are:

$$V_{NC1}=c_A(SNR,d,tp)_{NC1}\times(1)+c_B(SNR,d,tp)_{NC1}\times(0.1)$$

$$V_{NC2}=c_A(SNR,d,tp)_{NC2}\times(1)+c_B(SNR,d,tp)_{NC2}\times(0.1)$$

wherein $c_A$ and $c_B$ are calculated as a function of the estimated SINR, packet delay, d, and throughput, tp. Here, the relative revenue values of the two customers are $r_A$=1 and $r_B$=0.1. We assumed that both customer have the same weight, i.e., $w_A$=$w_B$=1.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Figure 3:
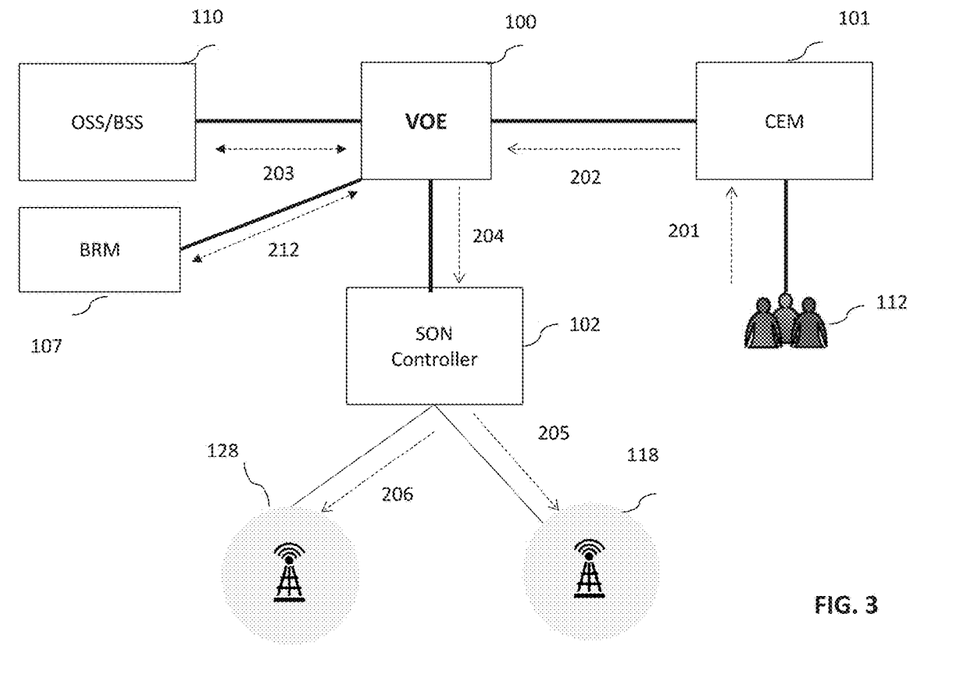
FIG. 3 illustrates an operator's software systems with VOE.

FIG. 3 illustrates the interconnectivity of Value Optimizing Engine (VOE) 100, the system of invention, in a mobile operator's systems infrastructure. VOE 100 connects to CEM 101 to receive subscriber related feedback and information to factor that information into its optimization engine. VOE 100 also connects to OSS/BSS 110 to gather information related to user provisioning (i.e., if the subscriber is an IOT), general policies and rules related to subscribers and network operations. It also connects to BRM 107 to gather per-subscriber pricing/revenue. VOE 100 connects to SON controller 102, which directly controls the base stations in the network. A simple flow is also illustrated in the diagram. The following are the key information flows:

201: User related feedback is received by CEM 101,
202: The feedback is processed and relevant information is sent to VOE 100.
203: Rules, policies and predictions on usage are gathered from OSS/BSS 110.
212: Subscriber revenues are gathered from BRM 107.
204: VOE 100 sends instructions to SON controller 102 to optimize radio access parameters.
205/206: SON controller 102 or an OAM system adjusts the radio access parameters of base stations.

Figure 4:
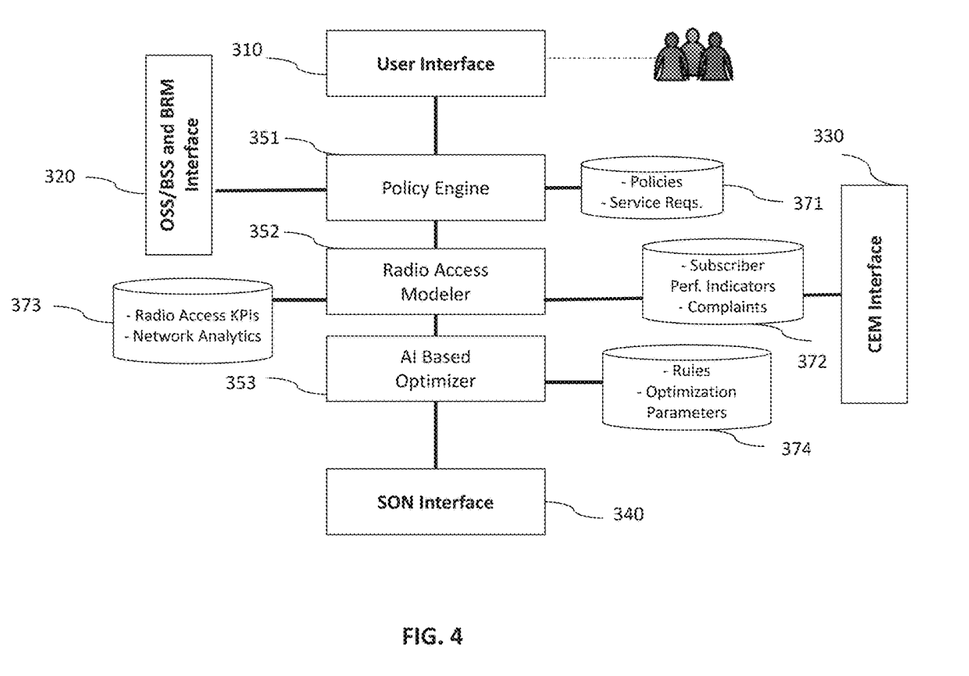
FIG. 4 depicts a block diagram of VOE.

FIG. 4 is a high-level block diagram of VOE 100 by illustrating an embodiment with several of its subcomponents. VOE 100 has interfaces to several other systems as illustrated in FIG. 3. The key interfaces are CEM interface 330, SON interface 340 (which can be another type of network-touching OAM interface if SON is not supported) and OSS/BSS/BRM interface 320. Each of these interfaces may be a plurality of different interfaces since there may be more than one system in each system category. Each interface can send and receive messages using the protocols or application programming interfaces (API)s supported by each interconnected system (i.e., CEM, SON, OAM, OSS, BSS, BRM, etc.). VOE 100 also has a user interface for the system operator to boot up and configure the platform, to add new rules and policies, or to select from a set of value functions, V, manually. Policy Engine 351 is where the policies are collected and stored in Policy Database 371. These policies may be manually entered or collected from OSS and BSS of the operator. Radio Access Modeler 352 is where radio access reconfigurations are determined in real-time. The key inputs are (i) the subscriber performance indicators obtained from CEM and other systems, and stored in database 372, (ii) network performance data and KPIs collected from the various network probes or OSSs and stored in database 372, (iii) revenue information collected from BRM 107 (stored as an optimization parameter in database 374), and (iv) policies and service requirements stored in database 371.

The Artificial Intelligence (AI) Based Optimizer 353 (also referred to as the Optimizer) is another key component that aided by Radio Access Modeler 352. This is a dynamic self-learning system trained by the Radio Access Modeler, which feeds the optimization solutions to meet the VOE objectives. In one embodiment, this AI system can be rule-based. In another embodiment, it can use machine-learning (also known as self-learning) using neural networks or other artificial intelligence (AI) techniques. Various AI techniques are known in prior art, but should be tailored particularly for rapidly solving the optimization problem of this invention. The AI techniques can be efficient in re-adjusting the weights, $w_i$ of Eq. (1) and (2) as solutions are accumulated.

Figure 5:
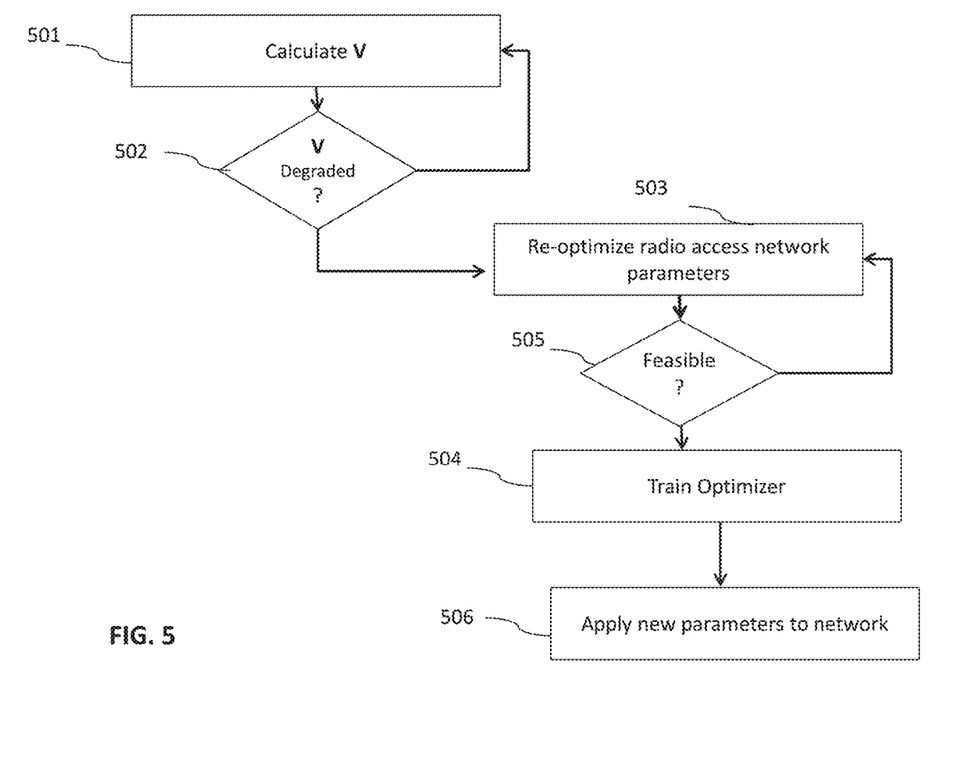
FIG. 5 depicts a simple flow chart showing the operations of VOE.

FIG. 5 depicts a simple flow chart of the method of invention. In step 501, VOE receives a new set of subscriber performance indicators and revenues from CEM and calculates the corresponding V. At step 502, it checks to determine if V corresponding to the new data is an indicative of performance deterioration. If not, it returns to step 501. If there is a need to re-optimize, in step 503, the radio access modeler collects other relevant data such as policies and network measurements and re-estimates the radio access parameters. In step 505, VOE checks to determine if the new parameters are feasible. If yes, it trains Optimizer 353 in step 504 accordingly, and in parallel it sends configuration commands to SON controller 102 in step 506. If no, radio access modeler 352 re-optimizes V to find another solution until a feasible one is found. Once Optimizer 353 is well-trained, radio access modeler plays a less important role. Meaning, Optimizer 353 can make decisions without resorting to the radio access modeler.

In an embodiment, the method of this invention can be extended by including a downloadable application, called the VOE App, the client of which resides in the subscriber's user equipment. The server of VOE App resides on the VOE system, for example, as part of the Radio Access Modeler subcomponent. The subscriber can use the VOE App to request an instant service quality improvement, which is received by the Radio Access Modeler. The feasibility of fulfillment of the specific request is evaluated using a method similar to the one shown in FIG. 5. The requested quality improvement may have a time limit (e.g., 1 hour) and/or may apply to a specific service type and/or can be billable (e.g., by Mbps or total downloaded Bytes). In another embodiment, the request may be automatically triggered via the VOE App client for a specific service type.

Various embodiments using variants of the method described so far is possible. For example, VOE can optimize only for a specific service type or group of services and ignore all other services. To reflect this choice, the subscriber value (or weight) can be adjusted accordingly to reflect high value for those users using the specific application type. The availability of multiple value functions, V, allows the network operator to choose the cost function that best reflects its operating principles.

Other embodiments not detailed here using the same principles may be considered, for example, moving subscribers from one serving base station to another serving base station for load distribution, or even changing the core network parameters to move around capacity in the network. All these variations and extensions are trivial within the context of this invention.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for value optimized mobile networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method to optimize, in real-time, a plurality of access network parameters in a radio access network, wherein a plurality of subscribers of one or more services provided by the radio access network have different relative subscriber values and weights to a network operator, the method comprising:
   (a) receiving subscriber performance indicators and network performance data regarding a plurality of base stations forming the radio access network, wherein each of the plurality of base stations providing communications services to a group within the plurality of subscribers;
   (b) optimizing, in real-time, a cost function, wherein the cost function is a function of the following: (i) the subscriber performance indicators received in the receiving step, (ii) the relative subscriber values, (iii) the relative subscriber weights, and (iv) the network performance data, the optimizing step performed to improve communications services provided to the plurality of subscribers;
   (c) determining a new set of access network parameters improving service performance for the plurality of subscribers;
   (d) sending instructions to systems controlling the plurality of access network parameters to change access network configurations according to the new set of access network parameters,
   wherein each of the relative subscriber values is obtained from a billing and revenue management system associated with the network operator, and
   wherein the cost function is linear and represented as a sum of weighted multiplication of the relative subscriber values and the subscriber performance indicators for all subscribers, wherein each of the relative subscriber weights is any of the following: 0, 1, or a number between 0 and 1.

2. The method of claim 1, wherein the relative subscriber values are derived using any of, or a combination of, the following: (a) a subscriber type, (b) an application type, (c) a subscriber network usage volume, (d) a subscriber's Quality of Service (QoS), and (e) a revenue associated with the plurality of subscribers.

3. The method of claim 1, wherein each of the relative subscriber values are a normalized value between 0 and 1, with 0 being least valued and 1 being most valued.

4. The method of claim 1, wherein each of the subscriber performance indicators is obtained for each subscriber in real-time from a customer experience management system.

5. The method of claim 1, wherein when a given relative subscriber weight within the relative subscriber weights is 0, the given relative subscriber weight is an indication that a corresponding subscriber is excluded from the cost function.

6. The method of claim 1, wherein when a given relative subscriber weight within the relative subscriber weights is larger than 0 but smaller than 1, the given relative subscriber weight is an indication that a corresponding subscriber's impact on the cost function is reduced according to a predefined policy.

7. The method of claim 1, wherein the cost function is a non-linear function, wherein each of the relative subscriber weights are any of the following: 0, 1, or a number between 0 and 1.

8. The method of claim 1, wherein each of the subscriber performance indicators is a function of a given subscriber's SINR, handover success rate and cell drop rate at a physical layer, and/or data throughput, delay and packet loss at an IP layer.

9. The method of claim 1, wherein one or more of the plurality of access network parameters are associated with the radio access network, the one or more of the plurality of access network parameters being any of, or a combination of, the following: a base station within the plurality of base stations and a number of antennas serving a subscriber, each antenna's down tilt angle, and each antenna beam's vector parameters and antenna power.

10. The method of claim 1, wherein the cost function further factors a subscriber request for an improved performance for a specific service type or for a specific duration.

11. The method of claim 10, wherein the subscriber request is received from an application running on a mobile device.

12. The method of claim 1, wherein the radio access network parameters are optimized only for a specific subscriber service type or group of service types.

13. The method of claim 1, wherein the optimizing step uses a machine learning algorithm to learn from previous optimization results.

14. An article of manufacture comprising non-transitory computer storage medium storing computer readable program code which, when executed by a computer, implements a method to optimize, in real-time, a plurality of access network parameters in a radio access network, wherein a plurality of subscribers of one or more services provided by the radio access network have different relative subscriber values and weights to a network operator, the non-transitory computer storage medium comprising:

(a) the computer readable program code receiving subscriber performance indicators and network performance data regarding a plurality of base stations forming the radio access network, wherein each of the plurality of base stations providing communications services to a group within the plurality of subscribers;

(b) the computer readable program code optimizing, in real-time, a cost function, wherein the cost function is a function of the following: (i) the subscriber performance indicators received in the receiving step, (ii) the relative subscriber values, (iii) relative subscriber weights, and (iv) the network performance data, the optimizing step performed to improve communications services provided to the plurality of subscribers;

(c) the computer readable program code determining a new set of access network parameters improving service performance for the plurality of subscribers;

(d) the computer readable program code sending instructions to systems controlling the plurality of access network parameters to change access network configurations according to the new set of access network parameters, wherein each of the relative subscriber values is obtained from a billing and revenue management system associated with the network operator, and wherein the cost function is linear and represented as a sum of weighted multiplication of the relative subscriber values and the subscriber performance indicators for all subscribers, wherein each of the relative subscriber weights is any of the following: 0, 1, or a number between 0 and 1.

15. The article of manufacture of claim 14, wherein the relative subscriber values are derived using any of, or a combination of, the following: (a) a subscriber type, (b) an application type, (c) a subscriber network usage volume, (d) a subscriber's Quality of Service (QoS), and (e) a revenue associated with the plurality of subscribers.

16. The article of manufacture of claim 14, wherein each of the relative subscriber values are a normalized value between 0 and 1, with 0 being least valued and 1 being most valued.

17. The article of manufacture of claim 14, wherein when a given relative subscriber weight within the relative subscriber weights in 0, the given relative subscriber weight is an indication that a corresponding subscriber is excluded from the cost function.

18. The article of manufacture of claim 14, wherein when a given relative subscriber weight within the relative subscriber weight is larger than 0 but smaller than 1, the given relative subscriber weight is an indication that a corresponding subscriber's impact on the cost function is reduced according to a predefined policy.

19. The article of manufacture of claim 14, wherein the cost function is a non-linear function, wherein each of the relative subscriber weights are any of the following: 0, 1, or a number between 0 and 1.

20. The article of manufacture of claim 14, wherein each of the subscriber performance indicators is a function of a given subscriber's SINK, handover success rate and cell drop rate at a physical layer, and/or data throughput, delay and packet loss at an IP layer.

21. The article of manufacture of claim 14, wherein one or more of the plurality of access network parameters are associated with the radio access network the one or more of the plurality of access network parameters being any of, or a combination of, the following: a base station within the plurality of base stations and a number of antennas serving a subscriber, each antenna's down tilt angle, and each antenna beam's vector parameters and antenna power.

* * * * *

UNITED STATES PATENT AND TRADEMARK OFFICE
CERTIFICATE OF CORRECTION

PATENT NO. : 10,425,860 B2
APPLICATION NO. : 15/803437
DATED : September 24, 2019
INVENTOR(S) : Oguz Oktay et al.

Page 1 of 1

It is certified that error appears in the above-identified patent and that said Letters Patent is hereby corrected as shown below:

Claim 20:
Column 14, Line 51, delete "SINK" and insert therefore --SINR--.

Signed and Sealed this
Ninth Day of June, 2020

Andrei Iancu
*Director of the United States Patent and Trademark Office*